United States Patent
Petrovic

(10) Patent No.: US 6,683,958 B2
(45) Date of Patent: *Jan. 27, 2004

(54) APPARATUS AND METHOD FOR EMBEDDING AND EXTRACTING INFORMATION IN ANALOG SIGNALS USING DISTRIBUTED SIGNAL FEATURES AND REPLICA MODULATION

(75) Inventor: Rade Petrovic, Wilmington, MA (US)

(73) Assignee: Verance Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/206,826

(22) Filed: Jul. 29, 2002

(65) Prior Publication Data

US 2003/0063747 A1 Apr. 3, 2003

Related U.S. Application Data

(63) Continuation of application No. 09/106,213, filed on Jun. 29, 1998, now Pat. No. 6,427,012, which is a continuation-in-part of application No. 08/858,562, filed on May 19, 1997, now Pat. No. 5,940,135, and a continuation-in-part of application No. 08/974,920, filed on Nov. 20, 1997, now Pat. No. 6,175,627.

(51) Int. Cl.[7] .............................................. H04N 7/167
(52) U.S. Cl. ..................... 380/238; 380/252; 380/43; 380/31; 713/176; 713/200; 382/191; 382/132
(58) Field of Search ................... 380/252, 253, 380/254, 238; 713/176, 200; 382/191, 232

(56) References Cited

U.S. PATENT DOCUMENTS

| | | | | |
|---|---|---|---|---|
| 5,613,004 A | * | 3/1997 | Cooperman et al. | 380/28 |
| 5,664,018 A | * | 9/1997 | Leighton | 380/54 |
| 5,822,432 A | * | 10/1998 | Moskowitz et al. | 380/28 |
| 5,825,892 A | * | 10/1998 | Braudaway et al. | 380/51 |
| 5,848,155 A | * | 12/1998 | Cox | 382/191 |
| 5,940,135 A | * | 8/1999 | Petrovic et al. | 343/473 |
| 5,949,885 A | * | 9/1999 | Leighton | 380/54 |
| 6,078,664 A | * | 6/2000 | Moskowitz et al. | 380/28 |
| 6,145,081 A | * | 11/2000 | Winograd et al. | 713/200 |

FOREIGN PATENT DOCUMENTS

| | | |
|---|---|---|
| EP | 0372601 | 6/1990 |
| WO | 9514289 | 5/1995 |
| WO | 9709797 | 3/1997 |
| WO | 9733391 | 9/1997 |
| WO | 9853565 | 11/1998 |
| WO | WO 99/39344 | * 8/1999 |
| WO | WO 00/00969 | * 1/2000 |

* cited by examiner

Primary Examiner—Gregory Morse
Assistant Examiner—Paul E. Callahan
(74) Attorney, Agent, or Firm—Rothwell, Figg, Ernst & Manbeck

(57) ABSTRACT

Apparatus and methods are provided for embedding or embedding digital data into an analog host or cover signal. A distributed signal feature of the cover signal in a particular domain (time, frequency or space) is calculated and compared with a set of predefined quantization values corresponding to an information symbol to be encoded. The amount of change required to modify the signal feature to the determined target quantization value is calculated and the cover signal is modified accordingly to so change the feature value over a predefined interval. Information symbols are extracted by the opposite process. In one embodiment, the predefined value is a short term autocorrelation value of the cover signal.

16 Claims, 10 Drawing Sheets

FIG.13

| frequency band | 5000Hz - 6000Hz |
|---|---|
| time intervals | T = 20-ms, sequential |
| distributed signal feature i-th symbol, i = 1, 2, .... | $\dfrac{I_{1,i} - I_{2,i}}{I_{1,i} + I_{2,i}}$, $I_{1,i} = \int_{(i-1)T}^{(i-0.5)T} s^2(t)\,dt$, $I_{2,i} = \int_{(i-0.5)T}^{iT} s^2(t)\,dt$ |
| quantization grid, binary symbols | Symbol 1: $Q_1$ = -0.9, -0.5, -0.1, 0.3, 0.7<br>Symbol 0: $Q_0$ = -0.7, -0.3, 0.1, 0.5, 0.9 |

APPARATUS AND METHOD FOR EMBEDDING AND EXTRACTING INFORMATION IN ANALOG SIGNALS USING DISTRIBUTED SIGNAL FEATURES AND REPLICA MODULATION

CROSS-REFERENCE TO RELATED APPLICATIONS

This application is a continuation of copending application Ser. No. 09/106,213 filed Jun. 29, 1998, now U.S. Pat. No. 6,427,012, and assigned to the same assignee as the present application, which is a continuation-in-part of application Ser. No. 08/858,562 filed May 19, 1997, now U.S. Pat. No. 5,940,135 and assigned to the same assignee as the present application, and which also is a continuation-in-part of application Ser. No. 08/974,920 filed Nov. 20, 1997, now U.S. Pat. No. 6,175,627, and also assigned to the same assignee as the present application.

BACKGROUND OF THE INVENTION

1. Field of the Invention

This invention relates to apparatus and methods for encoding and decoding information in analog signals, such as audio, video and data signals, either transmitted by radio wave transmission or wired transmission, or stored in a recording medium such as optical or magnetic disks, magnetic tape, or solid state memory.

2. Background and Description of Related Art

An area of particular interest to certain embodiments of the present invention relates to the market for musical recordings. Currently, a large number of people listen to musical recordings on radio or television. They often hear a recording which they like enough to purchase, but don't know the name of the song, the artist performing it, or the record, tape, or CD album of which it is part. As a result, the number of recordings which people purchase is less than it otherwise would be if there was a simple way for people to identify which of the recordings that they hear on the radio or TV they wish to purchase.

Another area of interest to certain embodiments of the invention is copy control. There is currently a large market for audio software products, such as musical recordings. One of the problems in this market is the ease of copying such products without paying those who produce them. This problem is becoming particularly troublesome with the advent of recording techniques, such as digital audio tape (DAT), which make it possible for copies to be of very high quality. Thus it would be desirable to develop a scheme which would prevent the unauthorized copying of audio recordings, including the unauthorized copying of audio works broadcast over the airwaves. It is also desirable for copyright enforcement to be able to insert into program material such as audio or video signals digital copyright information identifying the copyright holder, which information may be detected by appropriate apparatus to identify the copyright owner of the program, while remaining imperceptible to the listener or viewer.

Various prior art methods of encoding additional information onto a source signal are known. For example, it is known to pulse-width modulate a signal to provide a common or encoded signal carrying at least two information portions or other useful portions. In U.S. Pat. No. 4,497,060 to Yang (1985) binary data is transmitted as a signal having two differing pulse-widths to represent logical "0" and "1" (e.g., the pulse-width durations for a "1" are twice the duration for a "0"). This correspondence also enables the determination of a clocking signal.

U.S. Pat. No. 4,937,807 to Weitz et al. (1990) discloses a method and apparatus for encoding signals for producing sound transmissions with digital information to enable addressing the stored representation of such signals. Specifically, the apparatus in Weitz et al. converts an analog signal for producing such sound transmissions to clocked digital signals comprising for each channel an audio data stream, a step-size stream and an emphasis stream.

With respect to systems in which audio signals produce audio transmissions, U.S. Pat. Nos. 4,876,617 to Best et al. (1989) and 5,113,437 to Best et al. (1992) disclose encoders for forming relatively thin and shallow (e.g., 150 Hz wide and 50 dB deep) notches in mid-range frequencies of an audio signal. The earlier of these patents discloses paired notch filters centered about the 2883 Hz and 3417 Hz frequencies; the later patent discloses notch filters but with randomly varying frequency pairs to discourage erasure or inhibit filtering of the information added to the notches. The encoders then add digital information in the form of signals in the lower frequency indicating a "0" and in the higher frequency a "1". In the later Best et al. patent an encoder samples the audio signal, delays the signal while calculating the signal level, and determines during the delay whether or not to add the data signal and, if so, at what signal level. The later Best et al. patent also notes that the "pseudo-random manner" in moving the notches makes the data signals more difficult to detect audibly.

Other prior art techniques employ the psychoacoustic model of the human perception characteristic to insert modulated or unmodulated tones into a host signal such that they will be masked by existing signal components and thus not perceived. See, e.g. Preuss et al., U.S. Pat. No. 5,319,735, and Jensen et al., U.S. Pat. No. 5,450,490. Such techniques are very expensive and complicated to implement, while suffering from a lack of robustness in the face of signal distortions imposed by perception-based compression schemes designed to eliminate masked signal components.

U.S. Pat. No. 5,613,004 to Cooperman et al. discloses a method for determining where to encode additional information into a stream of digital samples, wherein two pseudorandom keys are used to determine into which frequency bins of the digital data stream the additional information is to be encoded. A primary key has a number of bits equal to the sample window size. A secondary key or convolution mask has an arbitrary number of bits as a time mask, with each bit corresponding to a window. For each window, an encoder proceeds through each frequency bin, taking the corresponding bit of the primary key or mask and the bit of the convolutional mask corresponding to the window, and subjecting those bits to a boolean operation to determine whether or not the bin is to be used in the encoding process to encode the bits of the additional information message. When the last frequency bin in the window is processed, the next bit of the convolutional mask is retrieved and the primary mask is reset to the first bit. When the last window corresponding to the last bit of the convolutional mask is reached, the convolutional mask is reset to the first bit. Cooperman does not describe any specific method for the actual encoding of the additional information bits into the digital stream.

The prior art fails to provide a method and an apparatus for encoding and decoding auxiliary analog or digital information signals onto analog audio or video frequency signals for producing humanly perceived transmissions (i.e., sounds or images) such that the audio or video frequency signals produce substantially identical humanly perceived transmission prior to as well as-after encoding with the auxiliary signals. The prior art also fails to provide relatively simple apparatus and methods for encoding and decoding audio or video frequency signals for producing humanly perceived audio transmissions with signals defining digital information. The prior art also fails to disclose a method and apparatus for limiting unauthorized copying of audio or video frequency signals for producing humanly perceived audio transmissions.

SUMMARY OF THE INVENTION

The present invention provides apparatus and methods for embedding or encoding, and extracting or decoding, digitized information in an analog host or cover signal in a way which has minimal impact on the perception of the source information when the analog signal is applied to an appropriate output device, such as a speaker, a display monitor, or other electrical/electronic device.

The present invention further provides apparatus and methods for embedding and extracting machine readable signals in an analog cover signal which control the ability of a device to copy the cover signal.

In summary, the present invention provides for the encoding or embedding of a data signal in an analog host or cover signal, by modulating the host or cover signal so as to modify a distributed feature of the signal within the predefined region. The distributed feature of the host signal is modified to a predefined quantization value which corresponds to a data symbol or binary digit of the data signal to be embedded. Subsequently, the embedded data signal is recovered by detecting the modified distributed feature values and correlating the detected values with the predefined relationship between data symbols and quantized distributed feature values.

The term cover signal as used hereinafter refers to a host or source signal, such as an audio, video or other information signal, which carries or is intended to carry embedded or hidden digitized data. The terms distributed feature or signal feature as used hereinafter refer to a scalar value obtained by processing the cover signal values over the totality of the regions within domains (i.e., time, frequency and/or space) where the data-embedding modulation is applied. One desirable property for such processing is that random changes in signal magnitudes caused by noise or other signal distortions have a minimal effect on the signal feature value, while the combined effect of modulation of signal magnitudes for embedding of digitized data over a predefined region produces a measurable change in the feature value.

In particular, the present invention provides a method for embedding an information symbol in an analog cover signal, comprising the steps of calculating a distributed signal feature value of the cover signal over a predefined region, comparing the calculated signal feature value with a predefined set of quantization values corresponding to given information symbols and determining a target quantization value corresponding to the information symbol to be embedded, calculating the amount of change required in the cover signal to modify the calculated signal feature to the target quantization value, and modifying the cover signal according to the calculated amount of change.

According to another aspect of the invention, a method is provided for extracting an information symbol embedded in an analog cover signal, comprising the steps of calculating a distributed signal feature value of the cover signal over a predefined region, comparing the calculated signal feature value with a predefined set of quantization values corresponding to given information symbols and determining which quantization value corresponds to the calculated signal feature value, and translating the determined quantization value into the information symbol contained in the cover signal and outputting the information symbol.

The present invention further provides apparatus for embedding information in accordance with the above method, and apparatus for extracting the embedded information from the cover signal.

BRIEF DESCRIPTION OF THE DRAWINGS

These and other aspects of the present invention will become more fully understood from the following detailed description of the preferred embodiments in conjunction with the accompanying drawings, in which:

FIG. 13 is a table illustrating an example of specifications stego key 9 used for embedding and extracting digital data in an audio signal, according to the second embodiment of the invention;

DETAILED DESCRIPTION OF THE PREFERRED EMBODIMENTS

Figure 1:
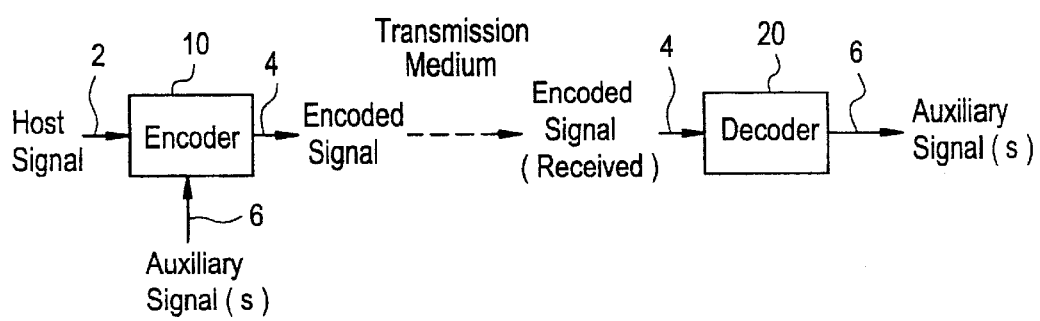
FIG. 1 is a block diagram of an auxiliary information signal encoding and decoding process according to a first embodiment of the present invention.

The present invention is directed to a method and apparatus for embedding information or data onto a cover signal, such as an audio signal, video signal, or other analog signal, by modulating or changing the value of a distributed feature of the cover signal in a selected region of the frequency, time and/or space domains of the cover signal. The information or data to be encoded is preferably a digital or digitized signal. The invention can implemented in a number of different ways, either by software programming of a digital processor, in the form of analog, digital, or mixed-signal integrated circuits, as a discrete component electronic device, or a combination of such implementations.

According to a first preferred embodiment of the invention, a method and apparatus are provided for encoding auxiliary information onto a host or source signal, such as an audio signal, video signal, or other data signal, by modulating or changing the short-term autocorrelation function of the host signal as a function of the auxiliary information over time, at one or more selected autocorrelation delays. The auxiliary information may be an analog or digital signal. The short-term autocorrelation function is obtained by multiplying a signal with a delayed version of itself, and integrating the product over a predefined integration interval.

The short-term autocorrelation function is modulated or changed by adding to the host signal a host modifying signal having a positive or negative correlation with the original host signal. The embedded signal is preferably a controllably attenuated version of the host signal which has been delayed or advanced (for purposes of the invention, an advance will be considered a negative delay) in accordance with the selected autocorrelation delay.

The autocorrelation function can be modulated using the entire host signal or only a portion of it. In the preferred embodiment, frequency bands, temporal and/or spatial regions of the host signal are chosen so as to minimize the disturbance to the host signal as it affects the perception of the signal's output (i.e., audio or video quality).

Multiple host modifying signal components can be added to the host signal in the same or different frequency bands and temporal and/or spatial regions by generating host modifying signal components with different autocorrelation delays. The multiple host modifying signal components can represent different auxiliary information to increase overall auxiliary information throughput, or can represent the same auxiliary information to increase the robustness or security of the auxiliary information signal transmission.

Security is enhanced by maintaining confidential the information concerning specific parameters of the host modifying signal, which would be known only to the encoder and decoder of the system. The host modifying signal components may also have autocorrelation delays which vary over time according to a predetermined sequence or pattern, referred to herein as a "delay hopping pattern."

First Embodiment

Referring now to the drawings, FIG. 1 shows a block diagram of the overall system according to a first embodiment of the invention. The system comprises an encoder 10 for encoding a host signal 2 (such as an audio or video program or source signal) with an auxiliary information signal 6, to produce an encoded signal 4. The encoded signal 4 may be transmitted over a communication medium, channel or line, or may be stored on a storage medium such as magnetic tape, optical memory, solid state memory, or electromagnetic memory, and also may be further processed such as by filtering, adaptive gain control, or other signal processing techniques, without impairing or degrading the encoded auxiliary information. The encoded signal 4 is then decoded in a decoder 20 to retrieve the auxiliary information signal 6.

Figure 2:
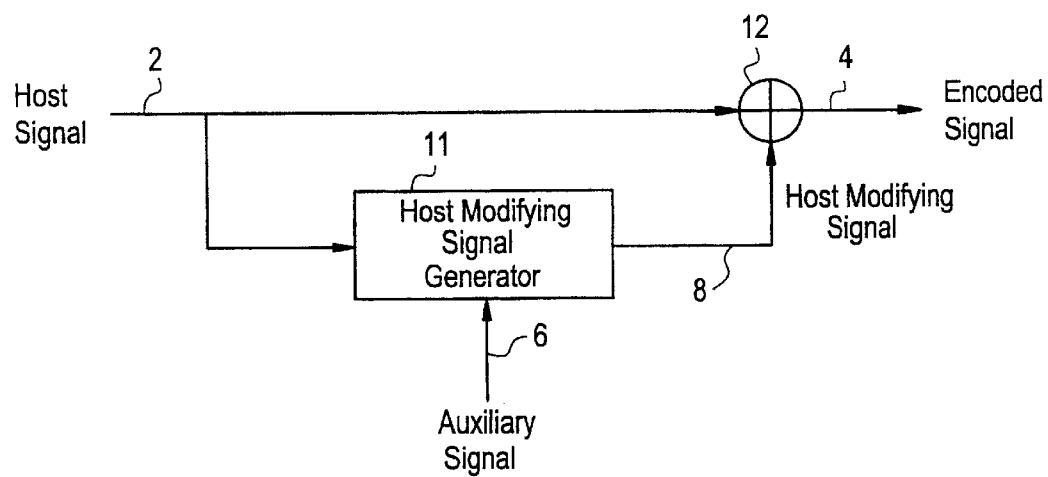
FIG. 2 is a block diagram of one embodiment of the encoder 10 of FIG. 1.

FIG. 2 shows a detail of a first implementation of the encoder 10 of the first embodiment in which the host signal is modified by a single host modifying signal 8, produced by a host modifying signal generator 11 which receives the host signal 2 and the auxiliary information signal 6. The host modifying signal is added to the host signal in an adder 14 to provide the encoded signal 4.

Figure 3:
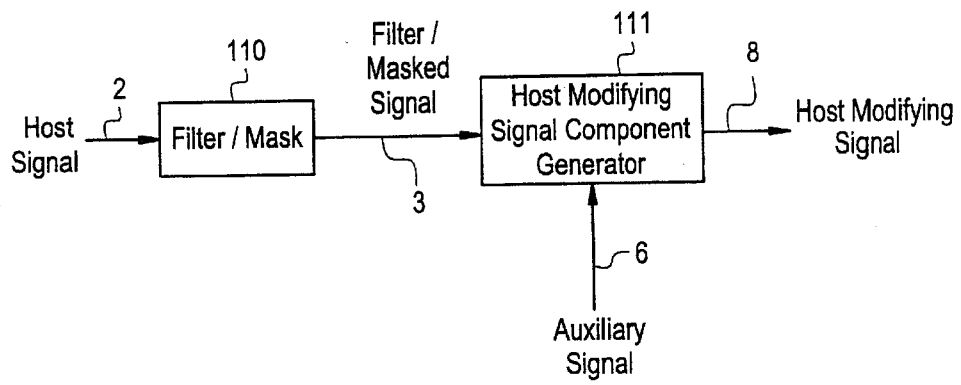
FIG. 3 is a block diagram of one embodiment of the host modifying signal generator 11 of FIG. 2.
Figure 4:
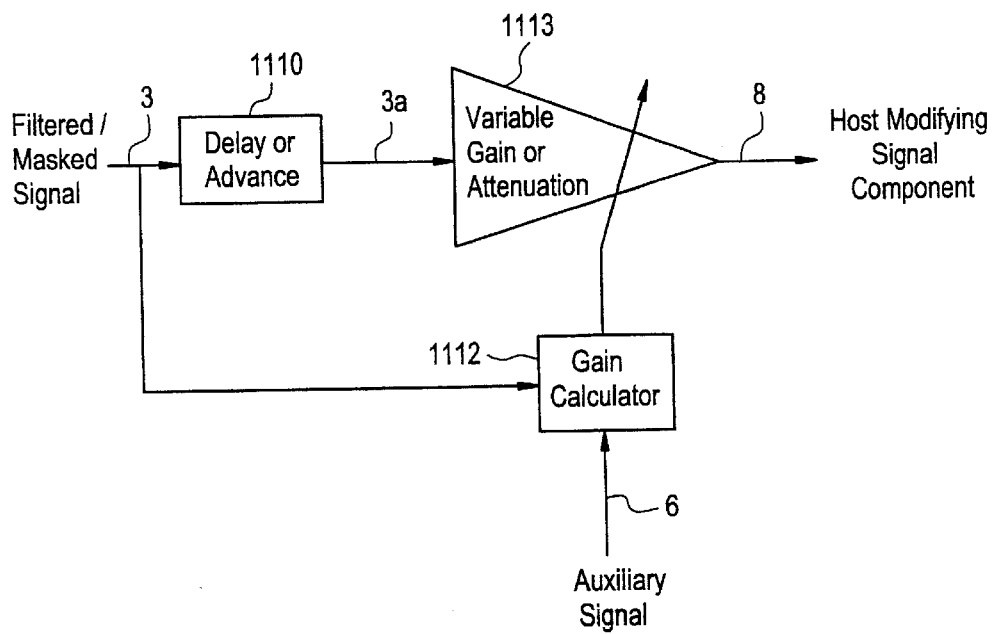
FIG. 4 is a block diagram of one embodiment of the host modifying signal component generator 111 of FIG. 3.

The host modifying signal is obtained as shown in FIG. 3, which illustrates one embodiment of the host modifying signal generator 11. In this embodiment, the host signal 2 is filtered and/or masked by a filter/mask 110. The filter/mask 110 modifies the frequency, period, or spatial content of the host signal in such manner to cause minimal disturbance to the output characteristics of the host signal when applied to an output device such as a speaker or a video monitor. It is also possible for the filter/mask to pass the host signal unchanged, in which case the filtered/masked signal 3 would be equal to the host signal 2. The signal 3 is then inputted to a host modifying signal component generator 111, wherein it is modified according to an input auxiliary information signal 6, to produce a host modifying signal 8. The details of the host modifying signal component generator 111 are shown in FIG. 4.

As shown, the filtered host signal 3 is inputted to a delay/advance circuit 1110 to produce a delayed/advanced signal 3a. The signal 3 is also inputted to a gain calculator 1112 along with auxiliary information signal 6. The purpose of the gain calculator 1112 is to calculate the gain of variable gain or attenuation circuit 1113 which is to be applied to delayed signal 3a in order to obtain the host modifying signal 8. The amount of delay (or advancement) applied by delay/advance circuit 1110 corresponds to the autocorrelation delay at which the host signal is being modulated.

The amount of gain applied to the signal 3a at any time or spatial region is determined by the gain calculator 1112 as a function of the values of the auxiliary information signal 6 and the filtered signal 3. The short-term autocorrelation of the filtered signal 3 can be expressed by the formula $$R(t, \tau) = \int_{t-T}^{t} s(x)s(x - \tau)dx \qquad (1)$$

where s(t) is the filtered signal 3, R(t,τ) is the short-term autocorrelation of s(t), τ is the delay at which the autocorrelation is evaluated, T is the integration interval, and t is time.

By adding a host modifying signal e(t) to the filtered signal s(t), the autocorrelation function R(t,τ) is modulated to obtain a modulated autocorrelation function $R_m(t,\tau)$:

$$R_m(t, \tau) = \int_{t-T}^{t} (s(x) + e(x))(s(x - \tau) + e(x - \tau))dx \qquad (2)$$

$$= R(t, \tau) + \int_{t-T}^{t} (s(x) + e(x - \tau) + e(x)(s(x - \tau) +$$

$$e(x)e(x - \tau))dx$$

By appropriately selecting the host modifying signal e(t), an increase or decrease of the short-term autocorrelation function can be achieved. It will be apparent that many different types of host modifying signals may be used to achieve this modulation. In the preferred embodiment, delayed or advanced versions of the host signal multiplied by a selected amount of gain or attenuation are used as the host modifying signal e(t). Specifically, $$e(t)=gs(t-\tau) \quad (3a)$$

or $$e(t)=gs(t+\tau) \quad (3b)$$

Substituting equations (3a) and (3b) respectively into equation (2), it is seen that the short-term autocorrelation of the resulting modified signal can be written as $$R_m(t,\tau)=R(t,\tau)+gR(t,2\tau)+gR(t-\tau,0)+g^2R(t-\tau,\tau) \quad (4a)$$

or $$R_m(t,\tau)=R(t,\tau)+gR(t,0)+gR(t+\tau,2\tau)+g^2R(t+\tau,\tau) \quad (4b)$$

The autocorrelation functions R(t,τ) of the host signal which appear on the right hand side of equations (4a) and (4b) can be measured, and their values used to obtain the solution for gain g that will produce a desired value for the modulated autocorrelation function $R_m(t,\tau)$ It is typically desired to have small values for g so as to keep the host modifying signal transparent to the perceiver of the host signal. If this is the case, the $g^2$ terms in equations (4a) and (4b) can be ignored as negligible, such that the exact gain value can be closely approximated by $$g \approx \frac{R_m(t,\tau) - R(t,\tau)}{R(t,2\tau) + R(t-\tau, 0)} \quad (5a)$$

or $$g \approx \frac{R_m(t,\tau) - R(t,\tau)}{R(t,0) + R(t+\tau, 2\tau)} \quad (5b)$$

respectively. While the present invention is equally applicable to the encoding of analog auxiliary information signals, the following discussion assumes the auxiliary information signal is a digital signal having values taken from an M-ary set of symbols $d_i \epsilon \{\pm 1, \pm 3, \ldots \pm(2M-1)\}$, for $i=1,2,3,\ldots$ which are transmitted at times $t=iT_S$, where $T_S$ denotes the symbol interval or period. According to the first preferred embodiment of the invention, each auxiliary information symbol is associated with a corresponding value of the short-term autocorrelation function. One way to map the symbols onto the autocorrelation function value domain while keeping the host modifying signal small with respect to the host signal, is to employ the formula $$R_m(iT_S,\tau)=\xi d_i R_m(iT_S,0) \quad (6)$$

where ξ is a small quantity selected to balance the requirement of signal robustness with the requirement that the host modifying signal be transparent to the perceiver. By inserting equations (4a) and (4b) respectively into equation (6), a quadratic equation for g is obtained, the solution of which provides the appropriate gain $g_i$ for the symbol transmitted at time $t=iT_S$. Alternatively, approximate values for $g_i$ can be obtained using formulas (5a) or (5b). The gain is held constant over the symbol interval in order to minimize any errors. Further deviation of $g_i$ from its desired value can be used at the boundaries of the symbol interval to avoid abrupt changes in the host modifying signal which might jeopardize the requirement for host modifying signal transparency. Modulation error caused by such smoothing does not significantly degrade the performance of the encoding system. The integration interval T should be shorter than $T_S-\tau$ in order to minimize intersymbol interference. However, certain overlap between adjacent symbols can be tolerated in order to increase the auxiliary channel bandwidth.

In an alternative implementation, the gain calculator 1112 may map a fixed gain to be applied to the filtered/masked and delayed/advanced signal 3a according to only the value of the auxiliary information signal 6. According to this implementation, the gain calculator ignores the value of the signal 3, and as such the input line for signal 3 may be omitted. In this embodiment, the gain calculator will apply a fixed amount of gain depending on the value of the auxiliary signal 6. For example, in the instance where the auxiliary signal is a binary signal, the gain calculator could apply a predetermined positive gain for an auxiliary signal of "0" and a predetermined negative gain for an auxiliary signal of "1". This approach will enable the encoder to have reduced complexity; however, it requires a larger modifying signal to obtain the same performance characteristics in terms of bit-error rate or signal robustness.

Figure 6:
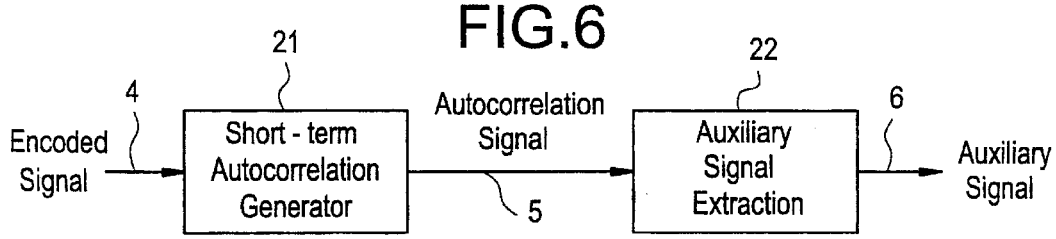
FIG. 6 is a block diagram of one embodiment of decoder 20 of FIG. 1.
Figure 7:
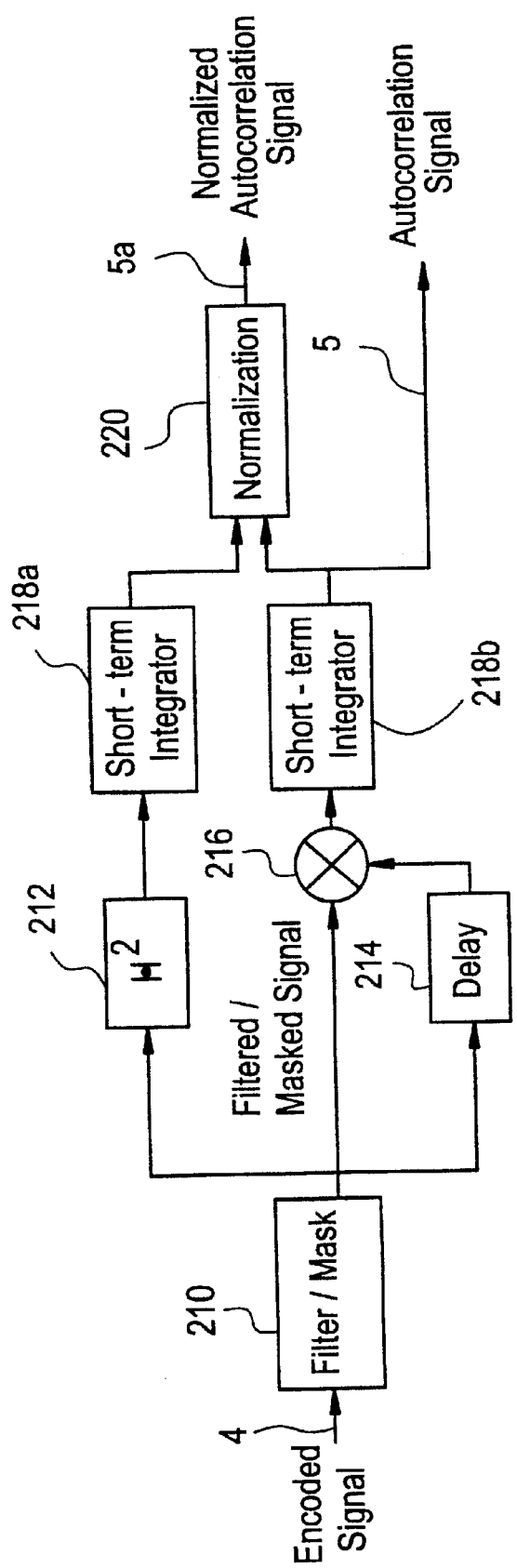
FIG. 7 is a block diagram of short-term autocorrelation generator 21 according to the first embodiment of the present invention.

In order to recover the auxiliary information signal 6 from the encoded signal 4, the encoded signal is applied to a decoder 20. Details of one embodiment of the decoder 20 are shown in FIG. 6. According to this embodiment, the decoder consists of a short-term autocorrelation generator 21 and an auxiliary signal extraction circuit 22. As shown in FIG. 7, the short-term autocorrelation generator 21 includes a filter/mask 210 which filters and/or masks the encoded signal 4, and then obtains an autocorrelation signal by applying the filtered encoded signal to a squaring circuit 212, a delay circuit 214, and a multiplier 216. The output of the squaring circuit 212 and the output of the multiplier 216 are applied to short-term integrators 218a and 218b. The output of integrator 218b is an autocorrelation signal 5. The outputs of integrators 218a and 218b are also applied to a normalization circuit 220, to produce a normalized autocorrelation signal 5a. The filter/mask 210 can have the same characteristics as the filter/mask 110 of the encoder (or may be different), and in some circumstances may be omitted entirely. The delay circuit 214 uses the same delay T as used in the delay/advance circuit 1110 of the encoder. The squaring circuit 212 calculates the square of the filtered encoded signal, which is the same as calculating the short-term autocorrelation with a delay of zero and integrating over interval T. The normalization circuit 220 outputs a normalized autocorrelation signal d(t), which is equal to:

$$d(t) = \frac{R_m(t,\tau)}{R_m(t,0)} \quad (7)$$

In the special case where the auxiliary signal is in the form of binary data, the information symbols can be recovered by determining the sign (+ or −) of $R_m(t,\tau)$ at the individual sampled symbol intervals, and thus it would be unnecessary to calculate the zero delay autocorrelation and the normalized autocorrelation signal.

The auxiliary information signal is obtained from the normalized autocorrelation signal by the auxiliary signal extraction circuit 22. In the absence of signal distortion, d(t) has values at discrete points in time separated by $T_S$ that are directly proportional to the magnitude of the input symbols. Signal extraction may be performed by one or more well known techniques in the art of digital communications, such as filtering, masking, equalization, synchronization, sampling, threshold comparison, and error control coding functions. Such techniques being well known, they will not be further elaborated upon.

According to a second implementation, each auxiliary data symbol may be associated with a set of short-term autocorrelation values, the particular set being chosen so as to minimize the value of g based upon the value of the auxiliary data symbol. As an example, for a binary-valued auxiliary signal, the bit transmitted at time $iT_S$ is associated with the set of autocorrelation values $2j \xi R_m(iT_S,0)$ for $j=0$, $\pm 1$, $\pm 2$, ... etc. if it is a "1", or the set $(2j-1)\xi R_m(iT_S,0)$ for $j=0$, $\pm 1$, $\pm 2$, ... etc. if it is a "0". The value of j for each bit is selected to minimize the magnitude of g obtained through solution of equations (4a) or (4b). Alternatively, approximate calculation can be performed by using equations (5a) or (5b) if j is chosen so that the value is nearest to $R(t,\tau)$. In this embodiment, the decoder operates in the same way as in the first implementation, except that multiple autocorrelation values are mapped to the same auxiliary information symbol.

According to a third implementation, the auxiliary information symbols are encoded as a difference in short-term autocorrelation functions at predefined time instances. For example, the symbol interval is divided into two equal parts and the autocorrelation function is determined for each part. The difference between the two autocorrelation functions is then changed so as to represent the auxiliary data. If the data symbol at $iT_S$ is $d_i \in \{\pm 1, \pm 3, \ldots \pm(2M-1)\}$, for $i=1, 2, 3, \ldots$, then the desired difference can be expressed by $$R_m(iT_S,\tau) - R_m((i+0.5)T_S,\tau) = \epsilon d_i R_m(iT_S,0))$$

where $\xi$ is a small quantity determined to balance the robustness/transparency requirements. Substituting equations (4a) or (4b) into equation (8) produces a quadratic equation for g which can be solved to obtain the value of g which is applied to the host modifying signal in the first half of the symbol interval. Gain equal in magnitude but opposite in sign (polarity) is applied to the host modifying signal in the second half of the symbol interval. To minimize intersymbol interference the integration interval should be shorter than $(T_S/2) - \tau$. A small amount of interference may be tolerated to obtain an increase in bit rate.

Figure 5:
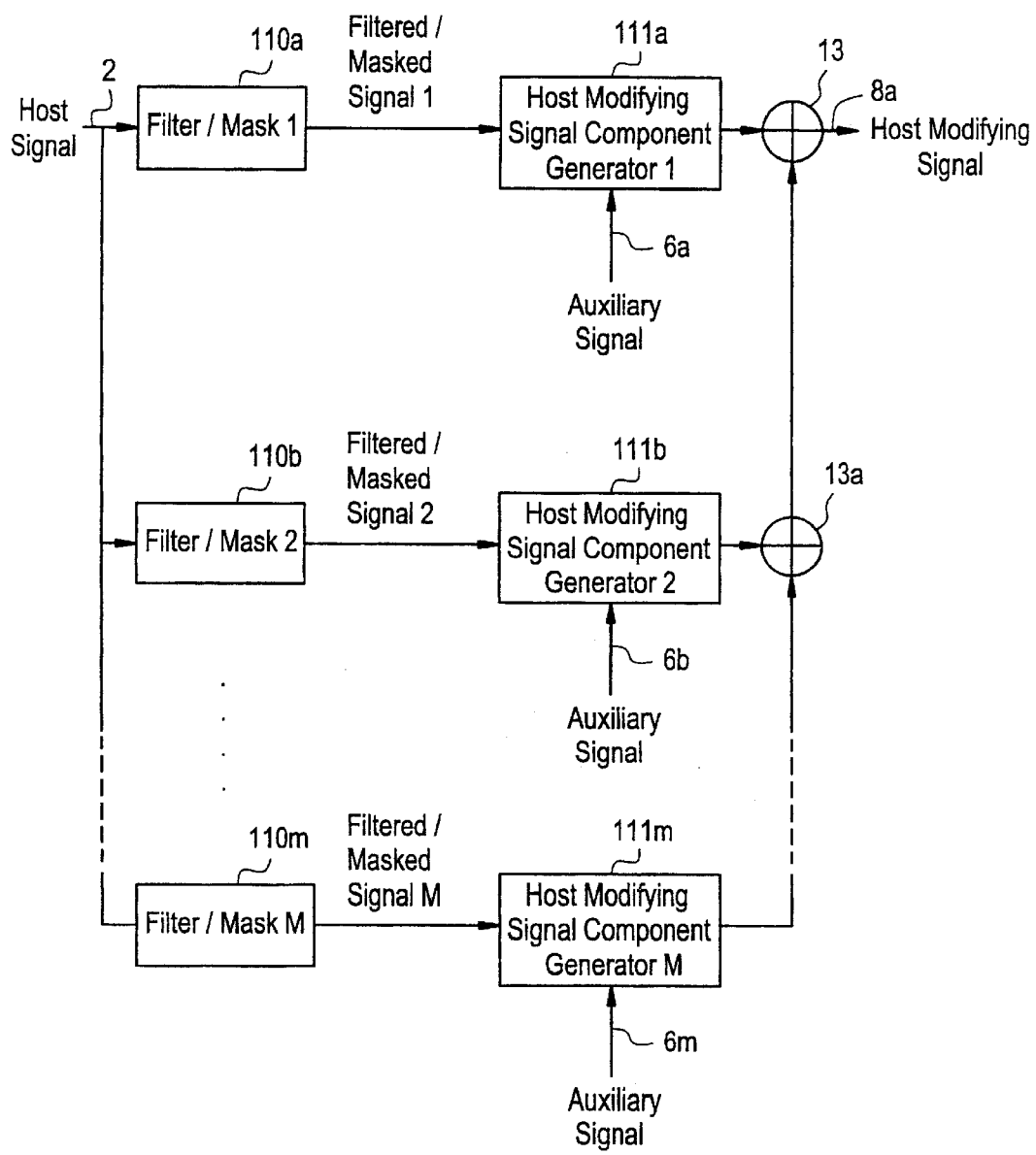
FIG. 5 is a block diagram of an alternate host modifying signal generator according to the first embodiment of the present invention.

According to another implementation, the host modifying signal is composed of a sum of multiple auxiliary information signal components, obtained according to the encoder shown in FIG. 5. Here, a plurality of filter/mask 110a–110m provide a plurality of host signals to a plurality of host modifying component generators 111a–111m, which are added together in adders 13, 13a, etc. to produce a host modifying signal 8a. In this embodiment, M auxiliary signal components are generated by using differing amounts of delay in each of the component generators. The auxiliary signals 6a–6m can each be different, or may be the same in order to increase robustness and security level. A restriction is that for any two component generators having equal amounts of delay, and appearing in the same or overlapping frequency bands, time intervals or spatial masks, the auxiliary signals must be the same. In this instance the preferred host modifying signals take the form:

$$e(t) = \Sigma g_m s(t-\tau_m) \quad (9)$$

where $\tau_m$ and $g_m$ represent the delay and gain for the mth host modifying symbol component. By substituting equation (9) into equation (2), the following is obtained:

$$R_m(t, \tau) = R(t, \tau) + \sum_{m=1}^{M} g_m(R(t, \tau_m + \tau) + R(t-\tau, t_m - \tau)) + \sum_{m1=1}^{M} \sum_{m2=1}^{M} g_{m1} g_{m2} R(t - \tau_{m1}, \tau + \tau_{m2} - \tau_{m1}) \quad (10)$$

For a random signal s(t), and sufficiently large $\tau$, $R(t,\tau)$ is much smaller than $R(t,0)$. Therefore the set of delays $\{\tau_m\}$ should be chosen such that $R_m(t,\tau)$ calculated for $\tau = \pm \tau_m$ according to equation (10) has only one term for which the short-term autocorrelation delay is equal to zero. This term will have dominant effect on the modulation of the $R_m(t,\tau_m)$. As different $\tau_m$ are chosen, different terms in equation (10) become dominant in the summation, effectively "tuning" different host modifying components.

Figure 8:
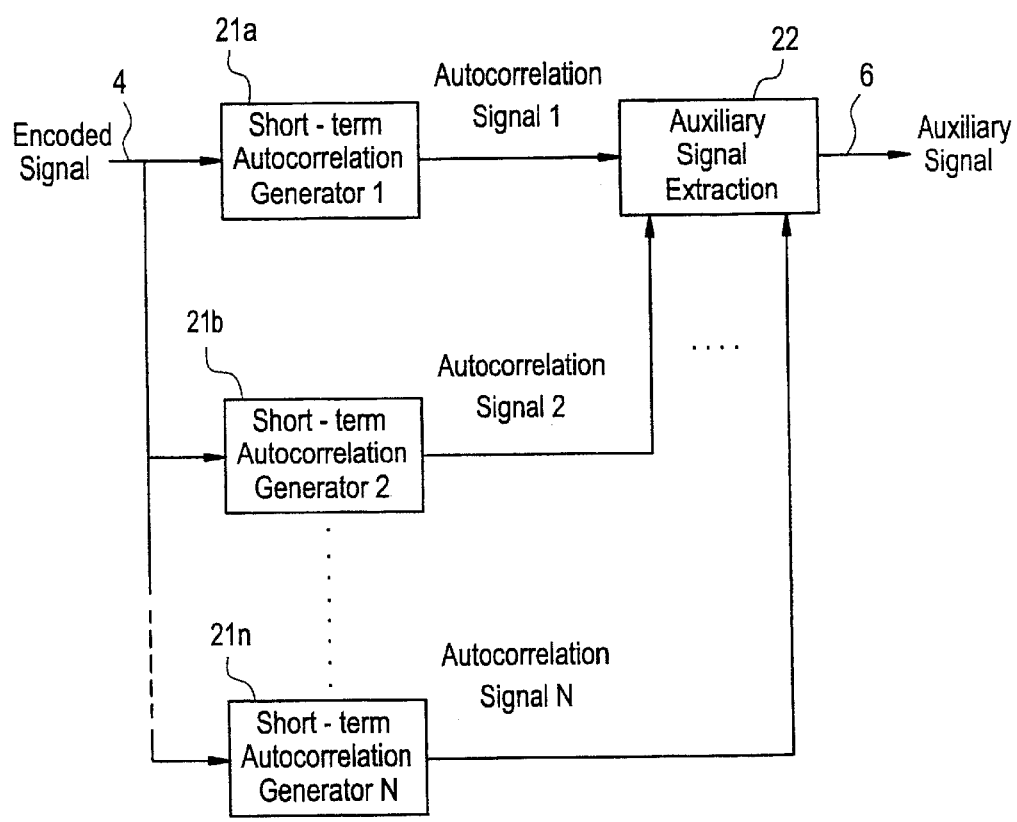
FIG. 8 is a block diagram of an alternate decoder 20 of FIG. 1 according to the first embodiment of the present invention.

The decoder associated with this embodiment is shown in FIG. 8. The decoder includes a number of short-term autocorrelation generators 21a–21n, one for each delay amount for which a host modifying signal component was generated. The generated autocorrelation signals are processed together by auxiliary signal extraction circuit 22 and are either combined to obtain the auxiliary signal or independently processed to extract a multiplicity of auxiliary information signals.

According to a fifth implementation according to the first embodiment of the invention, the host modifying signal components may change their corresponding autocorrelation delay amounts $\tau$ over time according to a predefined delay pattern referred to as "delay hopping." The security of the auxiliary signal is enhanced by maintaining the delay hopping pattern secret. The hopping pattern can be defined as a list of consecutive autocorrelation delays and their duration. An authorized decoder needs to know the hopping pattern as well as the filtering/masking parameters and signaling parameters (symbol duration and other symbol features). Multiple auxiliary signals can be carried simultaneously in the host signal if their hopping patterns are distinct, even if other filtering/masking and signalling parameters are the same.

The first embodiment of the invention as described above may be modified in many ways as would become apparent to those skilled in the art from reading the present description. For example, in the above description of the first preferred embodiment of the invention, reference has been made to the perception of the host signal by a "perceiver." In the context of the invention, a perceiver may be a device such as a computer, radar detector, or other electrical/electronic device in the case of host signal being communication signals, as well as a human in the case of audio or video host signals. Further, the implementation of the invention can be carried out using analog circuitry as well as digital circuitry such as ASICs (Application Specific Integrated Circuits), general purpose digital signal processors, microprocessors and equivalent apparatus. Further, it is possible for the characteristics of the filter/mask to change over time according to a predefined pattern which may have characteristic changes of varying duration. Finally, it is noted that a function similar to that of the present invention may be obtained under some circumstances using transform-domain processing techniques (such as Fourier or cepstral domain) which may be implemented using known algorithms such as the Fast Fourier Transform or FFT.

Second Embodiment

Figure 9:
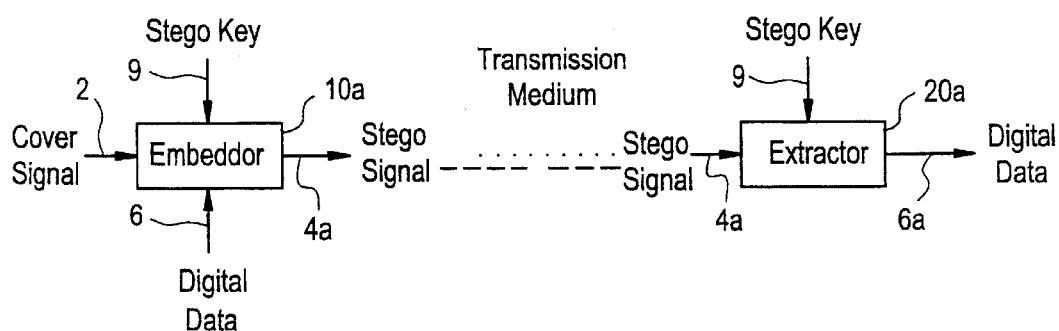
FIG. 9 is a block diagram of a data signal embedding and extracting circuit according to a second embodiment of the present invention.

Referring to FIG. 9, according to a second preferred embodiment, the invention employs an embeddor 10a to generate a stego signal 4a, which is substantially the same in terms of the content and quality of information carried by a cover signal 2. For instance, where cover signal 2 is a video or audio signal, the stego signal 4a will produce essentially the same video or audio program or information when applied to an output device such as a video display or loudspeaker.

A stego key 9 is used to determine and specify the particular region of the time, frequency and/or space domain of the cover signal 2 where the digital data 6 is to be embedded, as well as the distributed feature of the cover signal to be modified and the grid or table correlating digital data values with distributed feature quantization levels. For example, in the case of an audio signal, a particular frequency band and time interval define a region for embedding a data symbol. For a video signal, an embedding region is specified by a frequency band, a time interval in the form of an image field, frame or series of frames, and a particular area within the field or frame. FIG. 13 shows an example of the stego key specifications for frequency band, time interval, distributed signal feature, and symbol quantization grid, for an audio cover signal. Specific examples of distributed signal features are provided below.

The embeddor then appropriately modulates or modifies the cover signal 2 to obtain a stego signal 4a. Stego signal 4a can be transmitted, or stored in a storage medium such as magnetic tape, CD-ROM, solid state memory, and the like for later recall and/or transmission. The embedded digital data is recovered by an extractor 20a, having knowledge of or access to the stego key 9, which operates on the stego signal 4a to extract the digital data 6.

Figure 10:
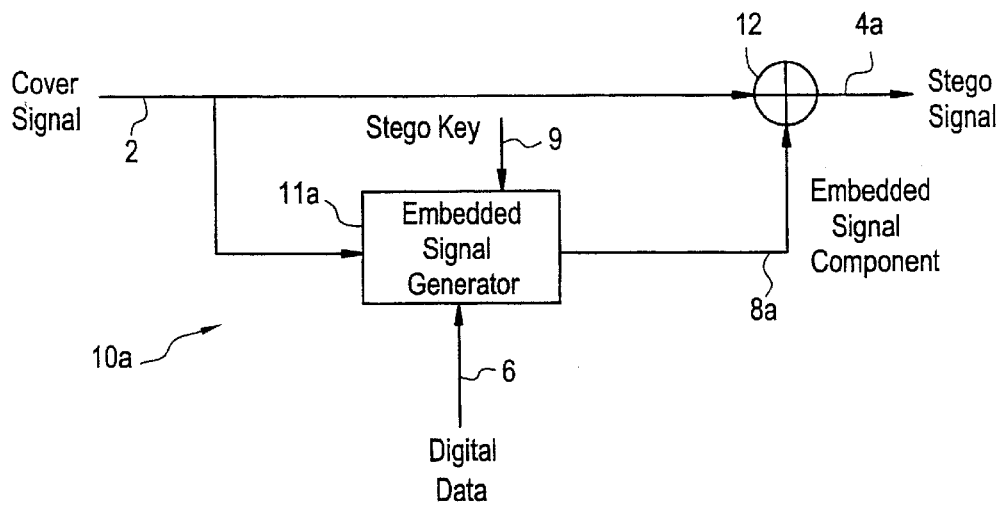
FIG. 10 is a block diagram of one embodiment of the embeddor 10*a* of FIG. 9.

FIG. 10 shows a block diagram of one embodiment of the embeddor 10a. As shown, the cover signal 2, stego key 9, and digital data 6 are inputted to an embedded signal generator 11a. The embedded signal generator modulates or modifies a predefined distributed feature of the cover signal 2 in accordance with the stego key 9 and digital data 6, and generates an embedded signal 8a. The cover signal 2 is then modified by adding the embedded signal 8a to the cover signal in an adder 12, to produce the stego signal 4a.

Figure 11:
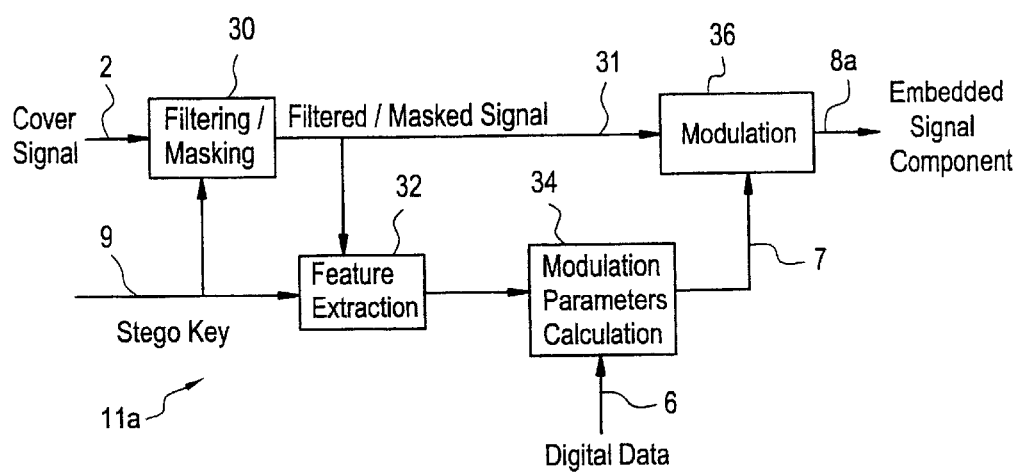
FIG. 11 is a block diagram of one embodiment of the embedded signal generator 11*a* of FIG. 10.

FIG. 11 illustrates the details of an embedded signal generator 11a used to generate a single embedded data signal. The cover signal 2 is filtered and/or masked in filtering/masking block 30 to produce a filtered/masked signal 31. The filtered/masked signal 31 is comprised of the selected regions of the cover signal, as specified by stego key 9, which are then used for embedding of data symbols. The signal 31 is then inputted to a feature extraction block 32, where the distributed feature to be modified, as specified by stego key 9, is extracted and provided to modulation parameter calculation module 34. Module 34 receives digital data 6 to be embedded in the cover signal, and determines the amount of modulation of the feature necessary to cause the feature to become approximately equal to the quantization value which corresponds to the digital data symbol or bit to be embedded. The calculation result 7 is then applied to modulation module 36, which modifies the filtered signal 31 to obtain the appropriate embedded signal component 8. The embedded signal component 8 is then added to the cover signal in adder 12 as shown in FIG. 10, to obtain the stego signal 4a.

It is further possible to embed multiple digital data signals in the cover signal 2, by using multiple embedded signal generators, each using a different stego key to modify a different feature of the cover signal and/or to use different regions of the cover signal, so as to produce multiple embedded signal components each of which are added to the cover signal 2. Alternatively, the different data signals may be embedded in a cascade fashion, with the output of one embeddor becoming the input of another embeddor using a different stego key.

According to an alternate embodiment, the filtering/masking module 30 may be eliminated. In this case, the cover signal is directly modified by the embedded signal generator to produce the stego signal. Accordingly, the adder 12 of FIG. 10 would not be required in this alternate embodiment.

Figure 12:
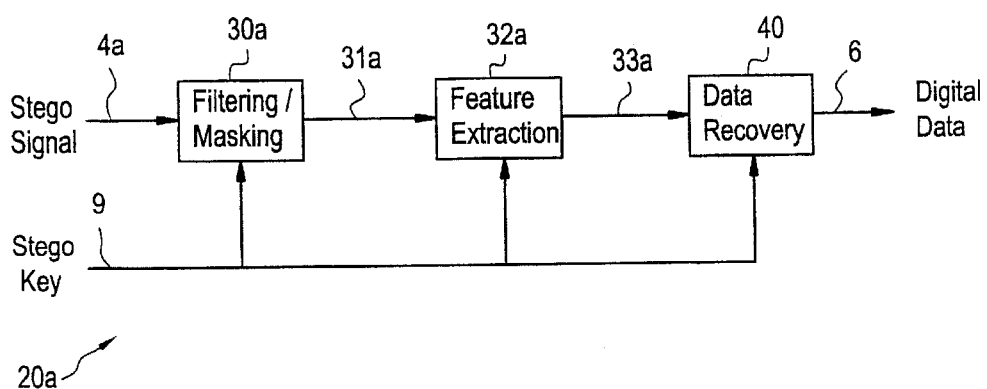
FIG. 12 is a block diagram of one embodiment of the data signal extractor 20*a* of FIG. 9.

A block diagram of an extractor 20a used to recover the digital data embedded in the stego signal is shown in FIG. 12. The stego signal is filtered/masked in filter/mask module 30a to isolate the regions where the digital data is embedded. The filtered signal 31a is inputted to feature extraction module 32a where the feature is extracted. The extracted feature 33a is then inputted to data recovery module 40 where the extracted feature is mapped to the quantization table or grid correlating quantized feature values with specific data symbols. A multiplicity of extracted data symbols is then subjected to well-known error detection, error correction, and synchronization techniques to verify the existence of an actual message and proper interpretation of the content of the message. Specific examples of cover signal distributed feature modulation to embed data are given hereinafter.

FIRST EXAMPLE

In this example, the cover signal 2 is an audio signal. In this embodiment, the audio signal is first filtered to isolate a specific frequency band to be used for embedding a particular data message, to produce a filtered audio signal s(t). Other frequency bands can be used to embed other messages, either concurrently or in a cascaded processing technique. In addition, restricting the frequency band to be modulated to only a fraction of the overall signal spectrum reduces the effect of such modulation on the host or cover signal. The filtering step may be omitted, however, without affecting either the efficiency of the embedding process or the robustness of the embedded data.

Next, a function f(s(t)) of the filtered audio signal s(t) is calculated as follows:

$$f(s(t)) = abs^\alpha(s(t)) \tag{11}$$

where abs( ) denotes an absolute value calculation, and $\alpha$ is a parameter. Systems using $\alpha=1$ and $\alpha=0.5$ have been successfully implemented by the present inventors.

Next, the function f(s(t)) is integrated over successive time intervals of length T to obtain:

$$I_i = \int_{(i-1)T}^{iT} f(s(t)) dt \tag{12}$$

where the interval T corresponds to the duration of a symbol.

In the fourth step, the distributed feature $F_i$ for the i-th symbol is calculated according to the following:

$$F_i = \frac{I_i}{\sum_{n=1}^{N} I_{i-n}(1 + g_{j-n})^p} \tag{13}$$

where $g_j$, j=1, 2, . . . , N are gain values calculated for N previous symbols, as shown below.

In the next step, the feature value $F_i$ is compared to a set of quantization levels belonging to a particular symbol, as defined by the stego key 9. The quantization level nearest to $F_i$ is determined. For example, in the case of binary digits, there are two sets, $Q_0$ and $Q_1$, corresponding to bits "0" and "1" respectively. The set of quantization levels for each set $Q_0$ and $Q_1$ are defined as:

$$Q_0 = q(2\kappa\epsilon), \kappa = 0, 1, 2, \ldots \tag{14}$$

$$Q_1 = q((2\kappa+1)\epsilon), \kappa = 0, 1, 2, \ldots$$

where $\epsilon$ is the quantization interval that determines the robustness/transparency tradeoff, while $q(x)$ is a monotonic function. Systems using $q(x)=x$ and $q(x)=\log(x)$ have been successfully implemented.

Next, the gain value $g_i$ to be applied in the i-th symbol interval is calculated according to:

$$g_i = (Q_i/F_i)^{1/\alpha} - 1 \tag{15}$$

where $Q_i$ is the nearest element of the quantization set belonging to the i-th symbol.

In the following step, the gain $g_i$ is applied to all signal amplitudes in the i-th symbol interval and the result is added back into the audio cover signal. Alternatively, this gain can be applied fully only in the middle portion of the symbol interval, and being tapered off toward the ends of the symbol interval. This approach reduces perception of the signal modification at the expense of a slight reduction in symbol robustness.

In order to extract the embedded data, the extractor first filters the stego signal in the same manner as the embeddor, which is defined by the stego key 9. Next, the feature is calculated according to equations (11) to (13), where it is assumed that the time interval T is known in advance as specified by the stego key 9, and the beginning of the embedded message coincides with the start of the extracting process.

In the next step, the embedded data symbols are extracted by mapping the calculated feature values to the quantization table or grid as defined by equation (14) (provided by the stego key 9), finding the closest match, and translating the quantization value into the corresponding symbol.

In the following step, consecutive extracted symbols are strung together and compared with a set of possible messages. If a match is found, the message is outputted to a user, or to a higher data protocol layer. If no match is found, repeated attempts at extraction are performed, by slightly shifting the starting time of the message by dT, which is a small fraction of the interval T (e.g., 0.01T to 0.1T).

SECOND EXAMPLE

In this example, after a filtering/masking step similar to the first example, a function $f(s(t))$ of the filtered audio signal $s(t)$ is calculated according to the following:

$$f(s(t)) = s^{2m}(t) \tag{16}$$

where m is an integer. Systems using m=1 and m=2 have been successfully implemented.

Next, two integrals are respectively generated over the first half and the second half of the i-th symbol interval:

$$I_{1,i} = \int_{(i-1)T}^{(i-0.5)T} f(s(t))dt, \quad I_{2,1} = \int_{(i-0.5)T}^{iT} f(s(t))dt \tag{17}$$

In the following step, the distributed feature $F_i$ for the i-th symbol is calculated according to:

$$F_i = \frac{I_{1,i} - I_{2,1}}{I_{1,i} + I_{2,1}} \tag{18}$$

Next, the calculated feature $F_i$ is compared to a predefined set of quantization values for the given symbol to be embedded, and the nearest quantization value is chosen. In this embodiment, the sets $Q_0$ and $Q_1$ of quantization values for binary digit symbols "0" and "1" are defined as:

$$Q_0 = q((2\kappa+0.5)\epsilon), \kappa = 0, \pm 1, \pm 2, \ldots \tag{19}$$

$$Q_1 = q((2\kappa-0.5)\epsilon), \kappa = 0, \pm 1, \pm 2, \ldots$$

where $\epsilon$ is the quantization interval that determines the robustness/transparency tradeoff, while $q(x)$ is a monotonic function. Successful implementations have been performed for $q(x)=x$ and $q(x)=x+\epsilon/2$.

In the next step the gain $g_i$ to be applied in the i-th symbol interval is calculated according to:

$$g_i \approx \frac{1}{2m} \frac{Q_i - F_i}{1 - Q_i F_i} \tag{20}$$

where $Q_i$ is the nearest element of the quantization set belonging to the i-th symbol. Equation (20) is derived as an approximation that holds well for small values of $g_i$ and reduces the amount of computation with respect to an exact formula, with negligible effects on system robustness.

Next, the calculated gain $g_i$ is applied to all signal amplitudes in the i-th symbol interval and the result is added back into the cover signal. Alternatively, the gain is applied fully only in the middle portion of the interval, and is tapered toward the ends of the interval.

The extractor process follows an analogous sequence to that described above for the first example.

Third Embodiment

The third embodiment of the invention is directed to a method and apparatus for embedding information or data onto a cover signal, such as an audio signal, video signal, or other analog signal (hereinafter called a "cover signal"), by generating a replica of the cover signal within a predefined frequency, time and/or space domain, modulating the replica with an auxiliary signal representing the information to be added to the cover signal, and then inserting the modulated replica back into the cover signal. The invention can implemented in a number of different ways, either by software programming of a digital processor, in the form of analog, digital, or mixed-signal integrated circuits, as a discrete component electronic device, or a combination of such implementations. The replica is similar to the cover signal in time and frequency domain content, but different in certain parameters as specified by a stego key, which is not generally known, but which is known at authorized receiving apparatus.

According to this embodiment of present invention, a replica of the cover signal 2 itself (see FIGS. 9 and 10) is used as a carrier for the auxiliary signal 6. Because the replica is inherently similar to the cover signal in terms of frequency content, no analysis of the cover signal is necessary in order to hide an auxiliary signal, such as a digital watermark.

In contrast, according to the prior art techniques discussed above, auxiliary signals are embedded in the form of a pseudorandom sequence (Preuss et al.) or in the form of multiple tones distributed over the frequency band of the cover signal (Jensen et al.). In order to "hide" such signals so that they are perceptively transparent, it was necessary to perform an analysis of the cover signal in the frequency domain to make the watermark signal imperceptible to the observer. Such analysis is based on the phenomenon that human perception will not detect a smaller signal in the presence of a larger signal if the two signals are sufficiently similar. This phenomenon is usually known as the masking effect.

The embedded signal 8 according to the present embodiment can be expressed by the formula:

$$w_i(t)=g_i m_i(t) r_i(t) \quad (21)$$

where $g_i <$ is a gain (scaling factor) parameter determined by tradeoff considerations of robustness versus transparency, $m_i(t)$ is the auxiliary signal 6, wherein $|m_i(t)| \leq 1$, and $r_i(t)$ is a replica of the cover signal 2. The gain factor $g_i$ can be a predetermined constant for a given application, or it can be adaptable, such that dynamic changes in transparency and robustness conditions can be taken into account. For example, in highly tonal musical passages the gains can be lower, while for spectrally rich or noisy audio signals the gains can be higher, with equivalent levels of transparency. In an alternate embodiment, the embeddor can perform an extractor process simulation to identify signals having less than desirable detectability, and increase the gain accordingly.

According to this embodiment, as shown in FIG. 10, the cover signal 2, stego key 9, and auxiliary signal (digital data) 6 are inputted to embedded signal generator 11a, which generates replica $r_i(t)$ from cover signal 2 according to the stego key 9, modulates or modifies the replica $r_i(t)$ with auxiliary signal 6 ($m_i(t)$), scales the result using gain parameter $g_i$, and generates an embedded signal 8a ($w_i(t)$). The embedded signal 8a is then added to the cover signal 2 (s(t)) in adder 12, to produce the stego signal 4a (s(t)).

The replica $r_i(t)$ is obtained by taking a portion of the cover signal 2 within a specified time, frequency and/or spatial domain as specified by the stego key 9, and then making slight modifications to the signal portion, also as specified by the stego key 9. The modifications to the signal portion need to be small to ensure that the replica remains similar to the cover signal as judged by the human psychoacoustic-psychovisual systems, but such modifications must be large enough to be detectable by an appropriately designed extractor having knowledge of or access to the stego key 9. As will be discussed below, a number of different types of modifications have been found to satisfy these requirements.

Equation (21) reveals that the replica $r_i(t)$ is modulated by the auxiliary signal $m_i(t)$ according to a process known as product modulation. Product modulation results in a broadening of the spectrum of the embedded signal proportionally to the spectral width of the auxiliary signal. In order to make the spectrum of the embedded signal similar to the spectrum of the cover signal (to preserve the transparency of the embedding process) the spectrum of the auxiliary signal must be narrow in comparison with the lowest frequency in the spectrum of the replica. This requirement imposes a limit on the capacity of the auxiliary channel, and dictates that low frequency components of the cover signal are unsuitable for inclusion in the creation of the replica.

In the preferred embodiment of the invention, the modulating signal (auxiliary signal) m(t) is a binary data signal defined by the formula:

$$m(t) = \sum_{n=1}^{N} b_n h(t - nT) \quad (22)$$

where N is the number of binary digits or bits in the message, $b_n \epsilon(-1, 1)$ is the n-th bit value, T is the bit interval, and h(t) represents the shape of the pulse representing the bit. Typically, h(t) is obtained by low-pass filtering a rectangular pulse so as to restrict the spectral width of the modulating (auxiliary) signal.

Figure 14:
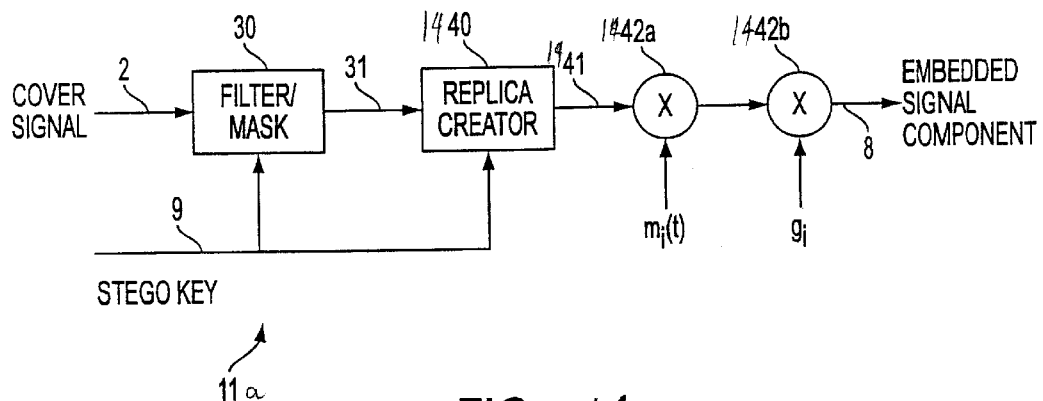
FIG. 14 is a block diagram of a second embodiment of the embedded signal generator 11*a* of FIG. 10.

FIG. 14 illustrates the details of an embedded signal generator 11a used to generate a single embedded data message according to this embodiment. The cover signal 2 is filtered and/or masked in filtering/masking block 30 to produce a filtered/masked signal 31. The filter/mask block 30 separates regions of the cover signal used for different embedded messages. For example, the filter/mask block may separate the frequency band region 1000–3000 Hz from the cover signal in the frequency domain, may separate the time interval region t=10 seconds to t=30 seconds from the cover signal in the time domain, or may separate the upper right spatial quadrant region of the cover signal in the spatial domain (such as where the cover signal is an MPEG, JPEG or equivalent signal) which separated region would then be used for auxiliary signal embedding.

The filtered/masked signal 31 is comprised of the selected regions of the cover signal, as specified by stego key 9, which are then used for creation of the replica signal 1441. The signal 31 is then inputted to a replica creator 1440, where predetermined parameters of the signal are modified, as specified by stego key 9, to create the replica $r_i(t)$ 1441. The replica 1441 is then modulated by the auxiliary signal $m_i(t)$ in multiplier 1442a, and the resultant signal is then scaled in multiplier 1442b according to the selected gain factor $g_i$ to produce embedded signal component 8 (i.e., $w_i(t)$ in equation (21)). The embedded signal component 8 is then added back to the cover signal 2 in adder 12 (FIG. 10) to obtain the stego signal 4. In order to maintain synchronization between the cover signal 2 and the embedded signal component 8, inherent processing delays present in the filter/mask block 30 and replica creator block 1440 are compensated for by adding an equivalent delay in the cover signal circuit path (between the cover signal input and the adder 12) shown in FIG. 10.

It is further possible to embed multiple auxiliary data signals in the cover signal 2, by using multiple embedded signal generators, each using a different stego key to modify a different feature of the cover signal and/or to use different regions of the cover signal, so as to produce multiple embedded signal components each of which are added to the cover signal 2. Alternatively, the different data signals may be embedded in a cascade fashion, with the output of one embeddor becoming the input of another embeddor using a different stego key. In either alternative interference between embedded signal components must be minimized. This can be accomplished by using non-overlapping frequency, time or space regions of the signal, or by selecting appropriate replica creation parameters, as disclosed below.

Figure 15:
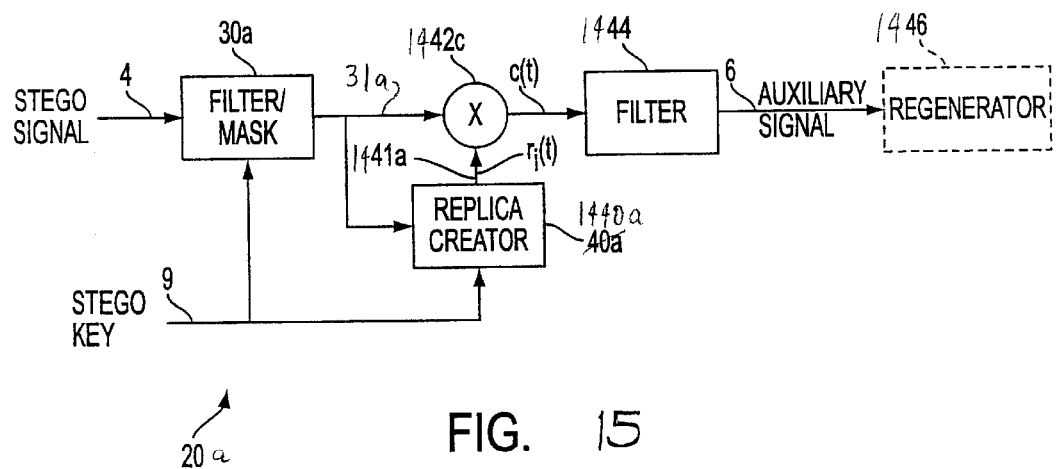
FIG. 15 is a block diagram of a second embodiment of the data signal extractor 20*a* of FIG. 9, used with the embodiment FIG. 14.

A block diagram of an extractor used to recover the auxiliary data embedded in the stego signal is shown in FIG. 15. The stego signal 4 is filtered/masked in filter/mask module 30a to isolate the regions where the auxiliary data is embedded. The filtered signal 31a is inputted to replica creator 1440a where a replica $r_i(t)$ 1441a of the stego signal is generated in the same manner as the replica $r_i(t)$ of the cover signal in the replica creator block 1440 in the embeddor, using the same stego key 9. The replica $r_i(t)$ of the stego signal 4 can be expressed by the formula:

$$r_i(t) = r_i(t) + \sum_i g_i R(m_i(t) r_i(t)) \approx r_i(t) \qquad (23)$$

where $R(m_i(t) r_i(t))$ represents the replica of the modulated cover signal replica. For sufficiently small gain factors $g_i$ the replica of the stego signal is substantially the same as the replica of the cover signal.

In the extractor 20a, the replica $r_i(t)$ 1441a is multiplied by the stego signal 31a in multiplier 1442c to obtain the correlation product:

$$c(t) = r_i(t)s(t) \approx r_j(t)s(t) + \Sigma g_i m_i(t) r_i(t) r_j(t) \qquad (24)$$

In designing the replica signal, one objective is to obtain spectra of the products $r_j(t)s(t)$ and $r_i(t)r_j(t)$ i≠j, with little low frequency content. On the other hand, the spectra of the product $r_j(t)r_j(t) = r_j^2(t)$ contains a strong DC component, and thus the correlation product c(t) contains a term of the form $g_i m_i(t) \text{mean}(r_j^2)$, i.e., c(t) contains the scaled auxiliary signal $m_i(t)$ as a summation term.

In order to extract the auxiliary signal $m_i(t)$ from the correlation product c(t), filtering is performed on c(t) by filter 1444, which has a filter characteristic matching the spectrum of the auxiliary signal. For example, in the case of a binary data signal with a rectangular pulse shape, the matched filtering corresponds to integration over the bit interval. In the case of digital signaling, the filtering operation is followed by symbol regeneration in a regenerator 1446. A multiplicity of the extracted data symbols is then subjected to well-known error detection, error correction, and synchronization techniques to verify the existence of an actual message and proper interpretation of the content of the message.

Figure 16:
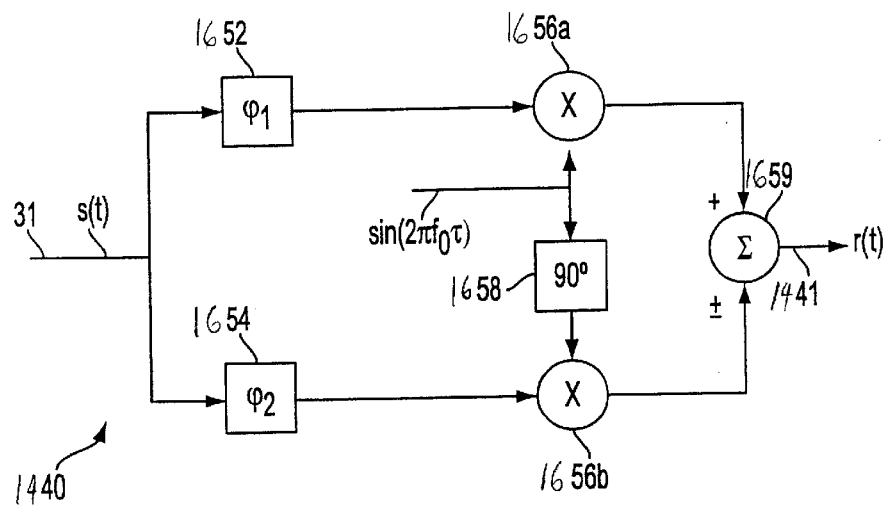
FIG. 16 is a block diagram of one embodiment of a replica generator which produces a cover signal replica shifted in frequency from the original.

One preferred embodiment of a replica creator 1440 is shown in FIG. 16. In this embodiment, a replica signal 1441 is obtained by shifting the frequency of the filtered cover signal 31 by a predetermined offset frequency $f_i$ as specified by the stego key 9. This shifting process is also known as single sideband amplitude modulation, or frequency translation. In addition to the processing shown in FIG. 16, a number of different techniques known in the art are available to perform this process.

Blocks 1652 and 1654 represent respective phase shifts of the input signal s(t). To achieve the desired frequency shift, the relationship between the phase shifts must be defined as:

$$\phi_1(f) - \phi_2(f) = 90° \qquad (25)$$

The respective phase-shifted signals are multiplied by sinusoidal signals with frequency $f_i$ in respective multipliers 1656a and 1656b. Block 1658 denotes a 90° phase shift of the sinusoidal signal applied to multiplier 1656b. The resulting signals are then combined in summer 1659. Thus, the replica signal 1441 can be expressed as:

$$r_i(t) = s(t, \phi_1) \sin(2\pi f_i t) \pm s(t, \phi_2) \cos(2\pi f_i t) \qquad (26)$$

where $s(t, \phi_i)$ denotes signal s(t) phase-shifted by $\phi_i$. The sign − or + in the summation process represents a respective shift up or down by $f_i$. According to psychoacoustic models published in the literature, better masking may be achieved when the shift is upward. Accordingly, in the preferred embodiment subtraction is used in equation (26). In a special case $\phi_1 = 90°$ and $\phi_2 = 0°$, such that equation(26) becomes:

$$r_i(t) = s_h(t) \sin(2\pi f_i t) \pm s(t) \cos(2\pi f_i t) \qquad (27)$$

where $s_h(t)$ is a Hilbert transform of the input signal, defined by:

$$s_h(t) = 1/\pi \int_{-\infty}^{\infty} \frac{s(x)}{t-x} dx \qquad (28)$$

The Hilbert transform may be performed in software by various known algorithms, with equation (27) being suitable for digital signal processing. For analog signal processing, it is easier to design a circuit pair that maintains the 90° relative phase shifts throughout the signal spectrum, than to perform a Hilbert transform.

The particular frequency offset $f_i$ can be chosen from a wide range of frequencies, and specified by the stego key. Multiple auxiliary signals can be inserted into the same time, frequency and/or space domain of the same cover signal, by having a different frequency offset value, to thus achieve a "layering" of auxiliary signals and increase auxiliary channel throughput.

The frequency offset also may be varied in time according to a predefined secret pattern (known as "frequency hopping"), to improve the security of a digital watermark represented by the auxiliary information.

The particular choice of frequency offset values is dependent upon the conditions and parameters of the particular application, and can be further fine tuned by trial and error. According to experimental results, optimal signal robustness in the presence of channel distortion was achieved where the frequency offset value was larger than the majority of spectrum frequencies of the modulating auxiliary signal m(t). On the other hand, optimal transparency was achieved where the frequency offset value was substantially smaller than the lowest frequency of the cover signal. As an example, for audio signal embedding a cover signal above 500 Hz was used with a frequency offset of 50 Hz, while the modulating signal was a binary data signal with a bit rate of 25 bps.

In an alternative embodiment of a replica creator, the replica is generated by shifting the phase of the filtered/masked portion 31 of the cover signal by a predetermined amount defined by a function $\phi_i(f)$ for an i-th embedded signal. In this case, the replica generators 40 and 40a are linear systems having a transfer function defined as:

$$H_i(f) = A_i e^{j\phi_i(f)} \qquad (29)$$

Where $A_i$ is a constant with respect to frequency, j is the imaginary number $\sqrt{-1}$i, and $\phi_i(f)$ is the phase characteristic of the system. Circuits described by equation (29) are known in the art as all-pass filters or phase correctors, and their design is well-known to those skilled in the art.

This embodiment is particularly suitable for auxiliary signal embedding in audio signals, since the human audio sensory system is substantially insensitive to phase shifts. The functions $\phi_i(f)$ are defined to meet the objective that the product of the replica and the cover signal contain minimal low frequency content. This can be achieved by maintaining at least a 90° shift for all frequency components in the filtered/masked signal 31. Multiple embedded messages have been implemented with little interference where the phase shift between frequency components of different messages is larger than 90° for the majority of the spectral components. The exact choice of the function $\phi_i(f)$ is otherwise governed by considerations of tradeoff between cost and security. In other words, the function should be complex enough so that it is difficult for unauthorized persons to determine the signal structure by analyzing the stego signal, even with the known cover signal, yet it should be computationally inexpensive to implement. A function hopping pattern which switches between different functions at predetermined intervals as part of the stego key can be used to further enhance security.

A special class of phase shift functions, defined by $$\phi_i(f) = \tau_i f \qquad (30)$$

where $\tau_i$ is a constant, results in time shift replicas of the cover signal. This class of functions has special properties in terms of cost/security tradeoff, which are beyond the scope of the present disclosure and will not be further treated here.

Figure 17A:
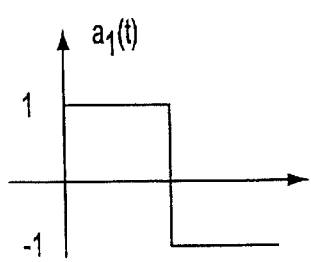
FIGS. 17(*a*)–17(*c*) are graphs showing a set of orthogonal functions used in the creation of an amplitude-shifted replica according to the embodiment of the present invention shown in FIGS. 14–16.
Figure 17B:
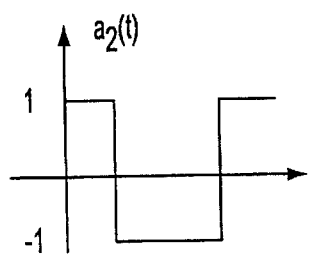
Figure 17C:
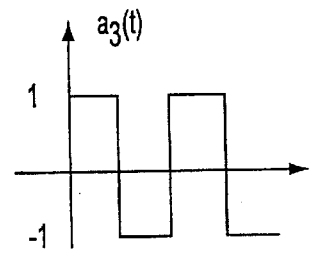

According to a further alternate embodiment of the invention, the replica generator obtains the replica signal by amplitude modulation of the cover signal. The amplitude modulation can be expressed by the equation $$r_i(t) = a_i(t)s(t) \qquad (31)$$

where $a_i(t)$ is a class of orthogonal functions. FIGS. 17(a)–17(c) illustrate a set of three elementary functions $a_1(t)$, $a_2(t)$, and $a_3(t)$ used to generate amplitude shifted replica signals, with each function being defined over the interval (0,T) where T equals the bit interval of the auxiliary signal. Longer replicas are generated by using a string of elementary functions. Post-correlation filtering in the extractor is performed by integration over the interval T, and the auxiliary channel bit $b_{j,n}$ is extracted according to the formula $b_{j,n} = \text{sign}(A_{j,n})$, where:

$$A_{j,n} = \int_{(n-1)T}^{nT} c(t)dt \approx \int_{(n-1)T}^{nT} a_j(t)s^2(t)dt + \qquad (32)$$

$$\sum_i g_i \int_{(n-1)T}^{nT} m_i(t)s^2(t)a_i(t)a_j(t)dt$$

$$\approx g_i \int_{(n-1)T}^{nT} m_j(t)s^2(t)dt$$

The above approximations hold, since $$\int_0^T a_j(t)dt = 0, \int_0^T a_i(t)a_j(t)dt = 0, \text{ for } i \neq j, \text{ and } a_j^2(t) = 1$$

As is apparent from equation (32), the sign of $A_{j,n}$ (and the received bit value) depends on the sign of $m_j(t)$ during the n-th bit interval, or in other words the transmitted bit value. The functions used for amplitude shifting generally should have a small low frequency content, a spectrum below the lowest frequency of the filtered/masked signal, and should be mutually orthogonal. The particular choice of functions depends upon the specific application, and is specified in the stego key.

According to yet another alternative embodiment, a combination of different shifts in different domains can be executed simultaneously to generate a replica signal. For example, a time shift can be combined with a frequency shift, or an amplitude shift can be combined with a phase shift. Such a combination shift can further improve the hiding (security) property of the embedding system, and also improve detectability of the embedded signal by increasing the difference from the cover signal.

With respect to security, attacks would be expected that incorporate analysis designed to reveal the parameters of the stego key. If such parameters become known, then the embedded signal can be overwritten or obliterated by use of the same stego key. Use of a combination of shifts makes such analysis more difficult by enlarging the parameter space.

With respect to detectability, certain naturally occurring signals may have a content similar to a replica signal; for example, echo in an audio signal may produce a phase shifted signal, choral passages in a musical program may produce a frequency shifted signal, and tremolo may produce amplitude shifts, which may interfere with embedded signal detection. Use of a combination of shifts reduces the likelihood that a natural phenomenon will exactly match the parameters of the stego key, and interfere with signal detection.

The invention having been thus described, it will be apparent to those skilled in the art that the same may be varied in many ways without departing from the spirit and scope of the invention. Any and all such modifications as would be apparent to those skilled in the art are intended to be covered by the following claims.

What is claimed is:

1. A method for encoding information symbols onto a host signal, comprising the steps of:

creating an auxiliary information carrier having a plurality of signal components, each signal component having a different delay or offset;

determining a value of an auxiliary information signal representing an information symbol;

calculating a value of said auxiliary information carrier corresponding to said determined value of said auxiliary information signal according to a predefined relationship between auxiliary information signal value and auxiliary information carrier;

developing a host modifying signal for modifying said host signal based upon said calculated value; and modifying said host signal with said host modifying signal.

2. A method for encoding information symbols onto a host signal according to claim 1, wherein said host modifying signal is related to said host signal.

3. A method for encoding information symbols onto a host signal according to claim 1, wherein the step of modifying said host signal comprises the step of adding said host modifying signal to said host signal.

4. A method for encoding information symbols onto a host signal according to claim 1, wherein the step of developing comprises varying the amount of perturbation of said host signal as a function of said predefined relationship and the values of said host signal and said auxiliary information signal.

5. A method for encoding information symbols onto a host signal according to claim 1, further comprising the step of modifying a parameter of said host signal to produce a filtered host signal for use in developing said host modifying signal.

6. A method for encoding information symbols onto a host signal according to claim 5, wherein said parameter comprises the frequency content of said host signal.

7. A method for encoding information symbols onto a host signal according to claim 5, wherein said parameter comprises the spatial content of said host signal.

8. A method for encoding information symbols onto a host signal according to claim 5, wherein said parameter comprises a temporal region of said host signal.

9. A method for encoding information symbols onto a host signal according to claim 5, wherein said parameter comprises a sampling rate of said host signal.

10. A method for encoding information symbols onto a host signal according to claim 1, wherein said host signal is an audio signal.

11. A method for encoding information symbols onto a host signal according to claim 1, wherein said host signal is a video signal.

12. A method for encoding information symbols onto a host signal according to claim 1, wherein said host modifying signal is comprised of a sum of a plurality of modifying signal components, each having a different amount of delay with respect to said host signal.

13. A method for encoding information symbols onto a host signal according to claim 1, wherein said host modifying signal is delayed by a predetermined delay with respect to said host signal.

14. A method for encoding information symbols onto a host signal according to claim 13, wherein said predetermined delay varies as a function of time according to a predetermined pattern.

15. A method for encoding information symbols onto a host signal according to claim 1, wherein the step of developing comprises varying the amount of perturbation of said host signal as a function of said predefined relationship and said auxiliary information signal.

16. A method for decoding information symbols encoded onto a host signal, comprising the steps of:

comparing said encoded host signal with a predetermined auxiliary information carrier, wherein said auxiliary information carrier is based on predefined attributes of said host signal and is comprised of a plurality of signal components having varying amounts of delay or offset from each other;

correlating said encoded host signal with a particular signal component of said auxiliary information carrier; and determining a value of an information symbol as a function of the value of said correlated signal component and a predefined relationship between information symbol values and signal components of said auxiliary information carrier.

* * * * *